Jan. 23, 1968     D. I. J. WANG     3,364,991

ANISOTROPIC THERMAL INSULATION CONSTRUCTION

Filed Sept. 9, 1964

INVENTOR
DAVID I-J WANG
BY
ATTORNEY 3,364,991
ANISOTROPIC THERMAL INSULATION
CONSTRUCTION
David I. J. Wang, Buffalo, N.Y., assignor to Union
Carbide Corporation, a corporation of New York
Filed Sept. 9, 1964, Ser. No. 395,243
5 Claims. (Cl. 165—135)

This invention relates to anisotropic thermal insulation constructions located between relatively warm and cold boundaries, and particularly to such constructions suitable for high temperature systems at 1000° F. and above.

In recent years there has developed a need for high temperature insulation constructions where the warmer temperature is at least 1000° F. such as encountered for hypersonic aircraft, or as high at 3000° F. or more for orbital space vehicles upon reentry into the earth's atmosphere. Obviously such systems must be lightweight. One proposed construction described in Paivanas et al. U.S. Patent 3,133,422 includes a composite multi-layered insulation having low conductive fibrous material layers alternating with radiant heat barriers. A fluid conduit extends from the cold boundary to the warm boundary for transporting a heat absorbing fluid. At least one thin, non-self-supporting highly conductive metal shield is located within the multi-layered insulation and is secured to the fluid conduit by low thermal resistance means at a region where the temperature is lower than the temperature assumed by the shield absent the securing so as to transfer heat from the shield to the fluid conduit. For high temperature systems this construction has a number of significant disadvantages, the most important being the low strength of the fibrous layers, the radiant heat barriers and the metal shield. Also, the extremely high temperatures experienced by space vehicles may well damage such constructions to the extent that their efficiency is seriously impaired. Another disadvantage is the complexity and high cost of carefully assembling the alternate layer system.

An object of this invention is to provide an improved high temperature thermal insulation construction.

Another object is to provide such a construction which possesses high strength at high temperatures.

Still another object is to provide an improved high temperature thermal insulation construction which is simple and relatively inexpensive to manufacture.

Other objects and advantages will be apparent from the ensuing description and the drawings in which.

Figure 1:
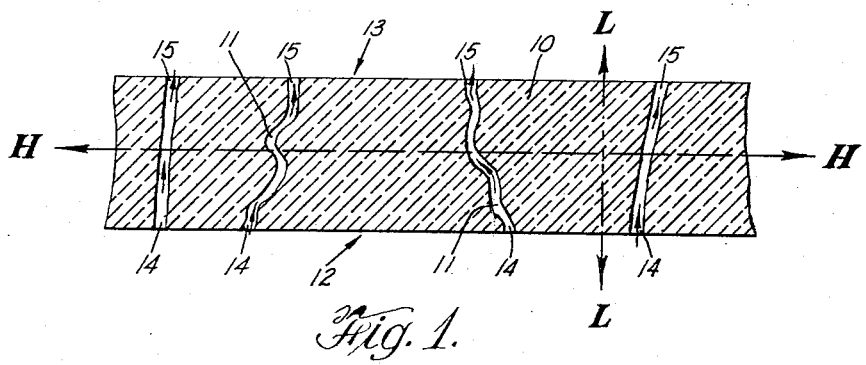
FIG. 1 is a cross-section view taken in elevation of an insulation construction embodying the invention.

The aforementioned objects are achieved by an insulation construction between relatively warm and cold boundaries including a homogeneous, impervious, dense, permanently shaped insulation body having anisotropic properties such that at 70° F. its thermal conductivity in the transverse direction is at least thirty times that in the normal direction. This body is aligned with its low conductive orientation parallel to the direction of heat flow between the warm and cold boundaries and its high conductive orientation perpendicular to this direction of heat flow. Multiple discrete fluid passageways extend through the insulation body in a direction generally perpendicular to its high conductive orientation. The passageways are generally uniformly distributed across the surface area of the insulation and number between 0.1 and 10 passageways per square inch and form between 0.1% and 5% of the surface area. Means are provided for supplying a heat absorbing fluid at the cold end of the multiple passageways for flow therethrough and discharge from their warm end, thereby transpirationally cooling the anisotropic insulation.

Anisotropic insulations are characterized by a thermal conductivity in the transverse direction orders of magnitude higher than its thermal conductivity in the normal direction. For use in the present invention, the ratio must be at least 30:1 at 70° F. temperature and thermal conductivity in the normal direction at 70° F. should not exceed about 5 B.t.u./hr. ft. ° F. Lower thermal conductivity ratios do not permit sufficient refrigeration recovery from the heat absorbing fluid in the discrete passageways in the transverse direction, and the thermal conductivity limit of 5 in the normal direction is necessary for high insulating quality. Suitable materials include pyrolytic graphite and pyrolytic boron nitride.

Unlike conventional graphite which is produced during the severe heating of a solid hydrocarbon, pyrolytic graphite is produced by thermally decomposing a hydrocarbon gas such as methane on a hot surface under carefully controlled environmental conditions. One currently used method consists of heating the hydrocarbon gas to temperatures of 2000° to 2500° C. in a vacuum furnace. During decomposition of the hydrocarbon gas, gaseous carbon condenses on the surface of a prepared mandrel which is usually but not necessarily, commercial graphite. Carbon atoms are deposited on the substrate in an orderly fashion, layer upon layer, producing an ordered structure which has a higher strength to weight ratio than commercial graphite.

The separate hexagonal layer planes of pyrolytic graphite are all parallel to the basal (deposition) plane, i.e. $ab$-plane, but do not have the regular appearance of a honeycomb with respect to each other. Examination shows that pyrolytic graphite is a highly oriented crystalline structure resembling densely packed stalagmites.

Commercial graphite has a random orientation of layer planes for the different crystallites, such that of the order of two crystals are oriented normal to the surface ($c$-axis) for every crystal parallel to the surface $ab$-plane. In contrast, pyrolytic graphite has on the order of one hundred to one thousand crystals in the $c$-orientation for each crystal in the $ab$-orientation. The high degree of anisotropy in the structure of pyrolytic graphite results in a high degree of anisotropy in all of its thermal properties except the specific heat, as illustrated in Table I.

TABLE I.—THERMAL PROPERTIES OF PYROLYTIC GRAPHITE

[Thermal conductivity B.t.u./hr.-ft.-° F.]

| Temperature, ° F. | Normal to surface ($c$-direction) =138.5 lb./ft.³ | Parallel to surface ($ab$-direction) =135.2 lb./ft.³ | Specific Heat (23), B.t.u./lb.-° F. |
|---|---|---|---|
| 0 | 1.44 | 238 | 0.10 (extrap.) |
| 500 | 0.702 | 200 | 0.30 |
| 1,000 | 0.292 | 160 | 0.39 |
| 1,500 | 0.172 | 126 | 0.44 |
| 2,000 | 0.135 | 86.7 | 0.47 |
| 2,500 | | | 0.49 |
| 3,000 | | | 0.50 |

Another suitable anisotropic material is pyrolytic boron nitride, made from the gas phase utilizing the following chemical reaction:

$$BCl_3 + NH_3 \rightarrow BN + 3HCl$$

A temperature of about 3450° F. and a pressure of approximately 1 mm. Hg are maintained in the reaction vessel containing a graphite substrate upon which the boron nitride is deposited. The deposit can either be left on the graphite as a coating or removed as a free-standing piece. The resulting material is a polycrystalline, pure (total impurities about 100 p.p.m.), hexagonal boron nitride with a very high crystallite orientation. Although it is a polycrystalline material, the crystallite orientation is extremely high, being on the order of 1000:1, thus resulting in the highly anisotropic properties typical of single crystal material (thermal conductivity ratio approximately 50:1). Pyrolytic boron nitride has no porosity, being impervious to helium as measured by a mass spectrometer. It is quite similar to pyrolytic graphite in its thermal and mechanical properties. However, in contrast to pyrolytic graphite, the thermal conductivity of pyrolytic boron nitride increases with temperature, varying linearly from about 0.85 B.t.u./hr. ft. ° F. at 0° C. to 1.7 at 800° C. The "$a$" direction thermal conductivity (36 B.t.u./hr. ft. ° F.) is unaffected by temperature from 0° F. to over 800° F. The "$a$" direction is actually two-dimensional, in the basal plane parallel to the deposition surface. The "$c$" direction is normal to the hexagonal layer planes and consequently is normal to the substrate or deposition surface.

The invention will be more clearly understood by reference to the drawings as hereinafter described.

Figure 2:
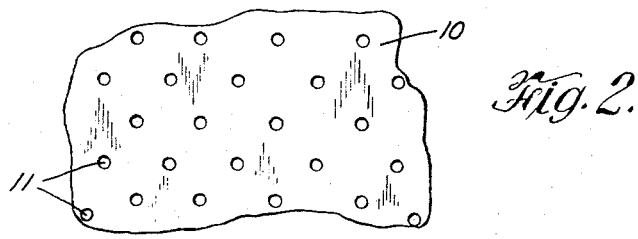
FIG. 2 is a plan view looking downwardly on a section of the FIG. 1 insulation construction.

FIGS. 1 and 2 illustrate a section of homogeneous, impervious, dense, permanently shaped insulation body 10 having anisotropic properties, as for example, pyrolytic graphite. It is important that body 10 be homogeneous for uniform transpirational cooling by the heat absorbing fluid, and for simplicity of fabrication. Complicated and expensive heterogeneous insulations are completely avoided. The characteristics of imperviousness, permanent shape and denseness are necessary for several reasons. For example, it would be impossible to form a specific number of discrete fluid passageways through the body if the latter were in the form of powder or foam. Also, porous structures are structurally weak as compared to non-porous impervious structures, and could not withstand the accelerations and aerodynamic stresses experienced by hypersonic or outer space vehicles. Finally, powders are not coherent systems and are objectionable for this obvious reason.

Fluid passageways 11 extend from the cold boundary 12 to the warm boundary 13 of anisotropic insulation body 10, generally aligned with its low conductive orientation (see line L—L) parallel to the direction of heat flow. Conversely, the high thermal conductive orientation (line H—H) of body 10 is aligned perpendicular to the direction of heat flow. Passageways 11 are integral with anisotropic insulation body such as may be provided by cored or drilled holes. The passageways may be straight or alternatively may assume tortuious shapes and have tributaries in order to facilitate intimate heat transfer with the insulation body.

It is also necessary that the discrete passageways 11 may be generally uniformly distributed across the surface area of the insulation body 10 as illustrated in FIG. 2, so that the various sections of the body are substantially uniformly cooled by the heat absorbing fluid.

The heat absorbing fluid is introduced to the cold end 14 of passageways 11 and flows therethrough to the warm ends 15 for venting. During flow, this fluid removes heat transferred to the passageways 11 through the insulation body along its high conductive orientation H—H. This heat has previously been received from the ambient atmosphere at its warm boundary 13 and preferentially flowed in the direction of high conductive orientation H—H although a portion of the incoming heat will have advanced in the direction of low conductive orientation L—L as well.

It has been previously indicated that fluid passageways 11 should be provided in number between 0.1 and 10 per square inch of the surface area of body 10, and in size to form between 0.1 and 5% of the surface area. These ranges permit adequate throughput rate of heat absorbing fluid for appreciable transverse cooling of the anisotropic body. At the same time the parameters afford substantially uniform cooling of the entire body thereby avoiding hot spots.

The heat absorbing fluid used in the invention may be one which absorbs sensible heat only and does not change phase. Alternatively, the heat absorbing fluid may be a liquid which vaporizes during transit through the passageways 11, so that both latent and sensible refrigeration are used to cool the anisotropic insulation body 10. A further choice is a fluid which undergoes endothermic chemical change at the higher temperatures encountered in the passageways 11. Finally, a binary fluid may be used whereby fractional vaporization or desorption of one component occurs as the fluid absorbs heat. The heat absorbing fluid may result from melting a portion of a stored solid. The heat absorbing fluid should have high heat absorption per unit weight over the desired temperature range, and may for example be water, hydrocarbon, fuel, or a cryogenic fluid initially in liquid form such as liquid hydrogen or nitrogen. Fluids having low molecular weight, e.g. hydrogen, are the most efficient for heat recovery in the insulation.

Figure 3:
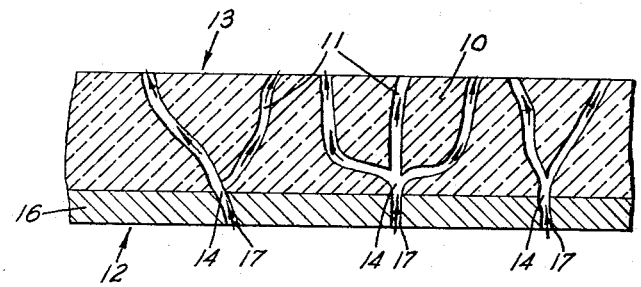
FIG. 3 is a cross-section view taken in elevation of an alternative insulation construction similar to the FIG. 1 embodiment but including a structural wall.

The structural integrity of pyrolytic graphite or pyrolytic boron nitride with passageways approaches that of the solid material, and in view of the latter's high strength, a separate structural support member may not be necessary for all systems. However, if support is needed the same may be supplied as illustrated in FIG. 3 by a metal wall 16 contiguously associated with the cold surface of insulation body 10 and bonded thereto. Metal wall 16 may also be provided with multiple passageways 17 substantially uniformly spaced thereacross and communicating with the cold ends 14 of the passageways 11 in the anisotropic insulation body 10. The heat absorbing fluid is introduced to metal wall passageways from the cold boundary 12 of the insulation construction and flows through the joining passageways 11 in the insulation body thereby abstracting heat therefrom.

Figure 4:
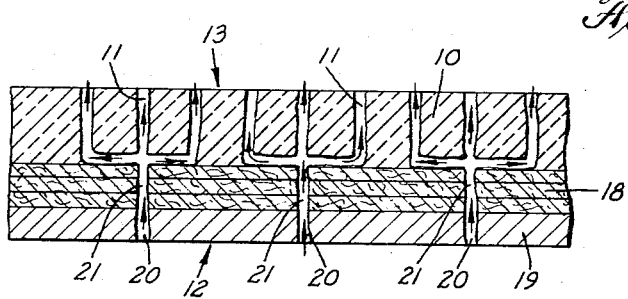
FIG. 4 is a cross-section view taken in elevation of another alternative insulation construction similar to FIG. 3 but also employing a second layer of thermal insulation.

As a further variation, the anisotropic insulation body may be combined with other thermal insulation materials on either or both its warm and cold boundaries. For example, a two-layer insulation construction useful as a heat shield such as for an atmosphere re-entry vehicle is illustrated in FIG. 4, and comprises anisotropic insulation body 10 and an inner layer of second low conductive thermal insulation 18 having substantial compressive strength. Selection of the second thermal insulation 18 depends on the temperature level and the predominate mode of heat transfer. Glass fibers of the type disclosed in Matsch U.S. Patent 3,007,596 are suitable up to about 900° F. whereas fibers of ceramic, quartz, potassium titanate or carbon are suitable for higher temperatures. Such insulations may also incorporate thin metal radiation shields, as described in the Matsch patent, if a major fraction of the total heat transfer is due to radiation. Second insulation layer 18 is bonded on its warm surface to the cold surface of anisotropic insulation body 10 and on its cold surface to the warm surface of the metal skin 19 of a vehicle capable of sustained hypersonic flight and re-entry to the earth's atmosphere. Because of the considerable strength of the anisotropic insulation, the required thickness of metal skin may possibly be reduced.

Metal skin 19 has multiple fluid passageways 20 therethrough substantially uniformly distributed across its surface, and communicating with discrete fluid passageways 22 extending laterally through second thermal insulation layer 18. The warm ends of fluid passageways 21 in turn communicate with fluid passageways 11 in the anisotropic insulation body 10. As illustrated in FIG. 4, each second insulation passageway 21 branches into three tributaries for passage through anisotropic insulation body 10. A larger or smaller number of passageways 11 in body 10 may also be provided.

Although preferred embodiments have been described in detail, it should be appreciated that modifications are contemplated, all within the scope of this invention.

What is claimed is:

1. An insulation construction between relatively warm and cold boundaries comprising:
   (a) a homogeneous, impervious, dense, permanently shaped insulation body having anisotropic properties such that its thermal conductivity in the transverse direction is at least thirty times that in the normal direction, with said normal direction thermal conductivity less than about 5 B.t.u./hr. ft. ° F. at 70° F. and aligned with its low conductive orientation parallel to the direction of heat flow between the warm and cold boundaries and its high conductive orientation perpendicular to said direction of heat flow;
   (b) multiple discrete fluid passageways extending through said insulation body in a direction generally perpendicular to its high conductive orientation, said passageways being generally uniformly distributed across the surface area of said insulation body in its high conductive orientation and in number between 0.1 and 10 passageways per square inch of said surface area and forming between 0.1% and 5% of said surface area; and
   (c) means for supplying a heat absorbing fluid at the cold end of said multiple passageways for flow therethrough and discharge from the warm end thereby cooling said insulation.

2. An insulation construction according to claim 1 in which the homogeneous anisotropic insulation is pyrolytic graphite.

3. An insulation construction according to claim 1 in which the homogeneous anisotropic insulation is pyrolytic boron nitride.

4. An insulation construction between relatively warm and cold boundaries comprising:
   (a) a homogeneous impervious, dense, permanently shaped insulation body having anisotropic properties such that its thermal conductivity in the transverse direction is at least thirty times that in the normal direction with said normal direction thermal conductivity less than about 5 B.t.u./hr. ft. ° F. at 70° F. and aligned with its low conductive orientation parallel to the direction of heat flow between the warm and cold boundaries and its high conductive orientation perpendicular to said direction of heat flow;
   (b) multiple discrete fluid passageways extending through the insulation body in a direction generally perpendicular to its high conductive orientation, said passageways being generally uniformly distributed across the surface area of said insulation body in its high conductive orientation in number between 0.1 and 10 passageways per square inch of said surface area and forming between 0.1% and 5% of said surface area;
   (c) a metal wall contiguously associated with and bonded to the cold surface of said insulation body in supporting relationship and having multiple passageways therethrough communicating with the cold ends of the passageways in said insulation body; and
   (d) means for supplying a heat absorbing fluid to the cold end of the metal wall passageways for flow therethrough and thence through the insulation body passageways thereby cooling the body.

5. An insulation construction between relatively warm and cold boundaries comprising:
   (a) a homogeneous impervious, dense, permanently shaped insulation body having anisotropic properties such that its thermal conductivity in the transverse direction is at least thirty times that in the normal direction with said normal direction thermal conductivity less than about 5 B.t.u./hr. ft. ° F. at 70° F. and aligned with its low conductive orientation parallel to the direction of heat flow between the warm and cold boundaries and its high conductive orientation perpendicular to said direction of heat flow;
   (b) multiple discrete fluid passageways extending through the insulation body in a direction generally perpendicular to its high conductive orientation, said passageways being generally uniformly distributed across the surface area of said insulation body in its high conductive orientation in number between 0.1 and 10 passageways per square inch of said surface area and forming between 0.1% and 5% of said surface area;
   (c) a layer of second low conductive thermal insulation having its warm outer surface contiguously associated with and supporting the homogeneous anisotropic insulation body having multiple discrete fluid passageways extending therethrough in a direction generally parallel to the direction of heat flow between the warm and cold boundaries and communicating with the cold ends of said passageways through the anisotropic insulation body;
   (d) a metal wall contiguously associated with and bonded to the cold inner surface of the second insulation layer, and having passageways therethrough communicating with the cold ends of the passageways through said second insulation layer; and
   (e) means for supplying a heat absorbing fluid at the cold end of the metal wall passageways for consecutive flow through the second insulation layer and homogeneous anisotropic insulation passageways thereby cooling said homogeneous anisotropic insulation body.

References Cited

UNITED STATES PATENTS

| | | | |
|---|---|---|---|
| 1,863,586 | 6/1932 | Wilke | 165—135 |
| 2,941,759 | 6/1960 | Rice et al. | 165—133 X |
| 3,082,611 | 3/1963 | Alvis et al. | 165—133 X |

OTHER REFERENCES

Materials in Design Engineering, February 1964, p. 78.

American Rocket Society Journal, January 1962, pp. 26–35 and 83–86.

Nature, vol. 193, Feb. 10, 1962, p. 571 and Mar. 17, 1962, p. 1066.

ROBERT A. O'LEARY, *Primary Examiner.*

M. A. ANTONAKAS, *Assistant Examiner.*